United States Patent
Tanaka et al.

(10) Patent No.: US 9,859,715 B2
(45) Date of Patent: Jan. 2, 2018

(54) STATION-BUILDING POWER SUPPLY DEVICE AND METHOD OF CONTROLLING THE SAME

(75) Inventors: Takeshi Tanaka, Tokyo (JP); Yasushi Matsumura, Tokyo (JP); Wataru Okuda, Tokyo (JP); Syuji Ishikura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 305 days.

(21) Appl. No.: 14/423,829

(22) PCT Filed: Aug. 29, 2012

(86) PCT No.: PCT/JP2012/071883
§ 371 (c)(1),
(2), (4) Date: Feb. 25, 2015

(87) PCT Pub. No.: WO2014/033862
PCT Pub. Date: Mar. 6, 2014

(65) Prior Publication Data
US 2015/0207329 A1 Jul. 23, 2015

(51) Int. Cl.
*H02J 5/00* (2016.01)
*H02J 3/04* (2006.01)
(Continued)

(52) U.S. Cl.
CPC ........ *H02J 5/00* (2013.01); *H02J 3/04* (2013.01); *H02J 3/34* (2013.01); *H02J 3/381* (2013.01);
(Continued)

(58) Field of Classification Search
CPC ........ H02J 5/00; H02J 3/04; H02J 3/34; H02J 3/381; H02J 2003/001; Y10T 307/32
(Continued)

(56) References Cited

FOREIGN PATENT DOCUMENTS

| JP | 61-108020 A | 5/1986 |
| JP | 61-251437 A | 11/1986 |

(Continued)

OTHER PUBLICATIONS

English Translation of Japanese patent publication JP 61-251437 (Yoshihisa), Nov. 8, 1986, 9 pages.*
(Continued)

*Primary Examiner* — Hal Kaplan
(74) *Attorney, Agent, or Firm* — Buchanan Ingersoll & Rooney PC

(57) ABSTRACT

A station-building power supply device is provided in each station building and supplies low-voltage AC power to station building facilities of each station building. There are two mode therein: a regenerative mode in which, when regenerative power regenerated by a train to an overhead wire becomes surplus, the surplus regenerative power supplied from the overhead wire and power supplied from a high-voltage distribution line are used together to supply low-voltage AC power corresponding to an amount of normal power consumption of the station building; and a standby power supply mode in which, when a power outage of the high-voltage distribution line occurs, power supplied from the overhead wire is used to supply low-voltage AC power corresponding to an amount of emergency power of the station building.

19 Claims, 4 Drawing Sheets

(51) Int. Cl.
*H02J 3/34* (2006.01)
*H02J 3/38* (2006.01)
*H02J 3/00* (2006.01)

(52) U.S. Cl.
CPC ....... *H02J 2003/001* (2013.01); *Y10T 307/32* (2015.04)

(58) Field of Classification Search
USPC .......................................................... 307/20
See application file for complete search history.

(56) References Cited

FOREIGN PATENT DOCUMENTS

| | | |
|---|---|---|
| JP | 63-263141 A | 10/1988 |
| JP | 63-291740 A | 11/1988 |
| JP | 9-033342 A | 2/1997 |
| JP | 10-337064 A | 12/1998 |
| JP | 2001-347857 A | 12/2001 |
| JP | 2005-247192 A | 9/2005 |
| JP | 2006-062427 A | 3/2006 |

OTHER PUBLICATIONS

Chinese Office Action dated Jul. 29, 2016 issued in corresponding Chinese Patent Appln. No. 201280075443.6, with English translation (13 pages).

Office Action (Patent Examination Report No. 1) dated Jul. 14, 2015, by the Australian Patent Office in corresponding Australian Patent Application No. 2012388975. (3 pages).

Japanese Office Action dated Mar. 10, 2015 issued in corresponding Japanese Patent Appln. No. 2014-532638, with English translation (3 pages).

International Search Report (PCT/ISA/210) dated May 14, 2013, by the Japanese Patent Office as the International Searching Authority for International Application No. PCT/JP2012/071883.

Written Opinion (PCT/ISA/237) dated May 14, 2013, by the Japanese Patent Office as the International Searching Authority for International Application No. PCT/JP2012/071883.

Office Action dated Dec. 16, 2014, by the Japanese Patent Office for Application No. 2014-532638, and an English translation thereof (5 pages).

* cited by examiner (a) REGENERATIVE MODE (b) STANDBY POWER SUPPLY MODE

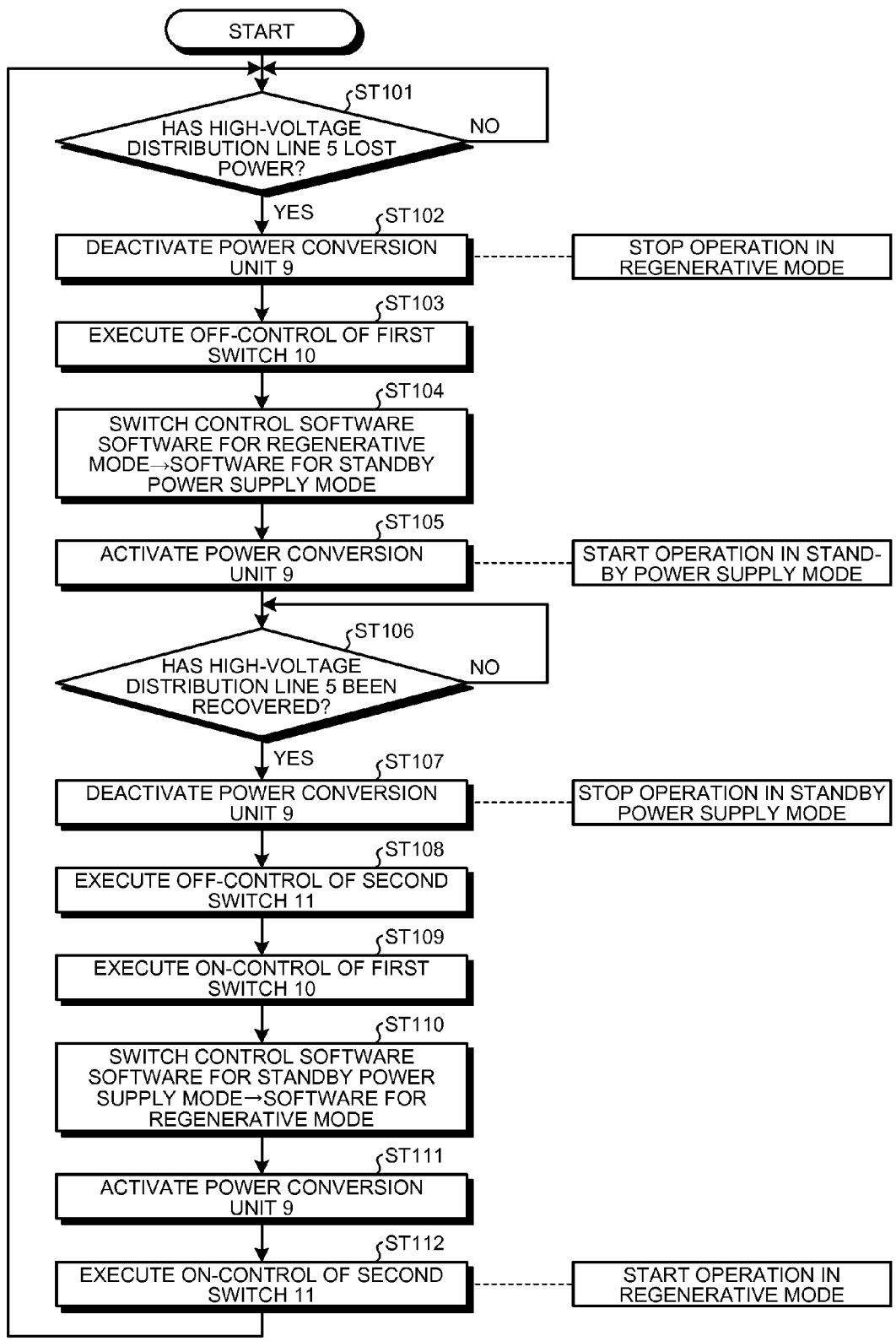

STATION-BUILDING POWER SUPPLY DEVICE AND METHOD OF CONTROLLING THE SAME

FIELD

The present invention relates to a station-building power supply device that supplies power to electric facilities, such as an air conditioner, a lighting system, and an elevator in a station building, (hereinafter, "station-building facilities") by using both power supplied from an alternating-current system and power supplied from an overhead wire, and a method for controlling the same.

BACKGROUND

In recent years, in a DC feeding system, regenerative power generated by a regenerative brake of a train is used as power-running electric power for other trains via an overhead wire. In such a DC feeding system, surplus regenerative power is intermittently generated in a same power transformation zone when the regenerative power exceeds the power-running electric power and it is effectively re-used by a power regenerative inverter installed in a substation.

Meanwhile, such a technique is disclosed in which if supply of commercial frequency power to an AC bus bar of the substation for electric railways is shut off, the operation of the power regenerative inverter is stopped and the power regenerative inverter is operated as a self-exciting inverter; and power supplied from an adjacent DC substation via the DC feeding system is converted to AC power. Accordingly, the emergency power is supplied to station building facilities of a station building via a high-voltage or extra high-voltage distribution system (Patent Literature 1, for example).

CITATION LIST

Patent Literature

Patent Literature 1: Japanese Patent Application Laid-open No. S61-251437

SUMMARY

Technical Problem

However, the above conventional technique has the following problems. The emergency power is supplied to the station building facilities of a plurality of station buildings via the high-voltage or extra high-voltage distribution system by operating the power regenerative inverter in the substation of electric railways as the self-exciting inverter, when the emergency power is supplied to the station buildings. Therefore, installation and handling thereof are not easy. Furthermore, it is difficult to supply each station building with the amount of power respectively required for.

The present invention has been achieved in view of the above problems. An objective of the present invention is to provide a station-building power supply device that is configured to easily be installed and handled and that is capable both of effectively utilizing surplus regenerative power and supplying emergency power to the station building in accordance with the amount of power required for each station building, as well as a method of controlling that device.

Solution to Problem

In order to solve the problem and achieve the objective described above, a station-building power supply device is provided that in each of station buildings of electric railways and supplies low-voltage AC power to station building facilities in each of the station buildings. The station-building power supply device includes: a regenerative mode in which, when regenerative power regenerated by a train and supplied to an overhead wire becomes surplus, the surplus regenerative power supplied via the overhead wire and power supplied from a high-voltage distribution line are used together so as to supply the low-voltage AC power corresponding to an amount of normal power consumption of the station building; and a standby power supply mode in which the low-voltage AC power corresponding to an amount of emergency power of the station building is supplied by using power supplied from the overhead wire, when a power outage of the high-voltage distribution line occurs.

Advantageous Effects of Invention

According to the present invention, a railway station is capable both of effectively utilizing surplus regenerative power and of being supplied with emergency power in accordance with the needed amount of power required for each station building with easy installation and handling.

BRIEF DESCRIPTION OF DRAWINGS

FIG. 4 is a control flowchart illustrating an example of a control process of the station-building power supply device illustrated in FIG. 3.

DESCRIPTION OF EMBODIMENTS

A station-building power supply device and a controlling method therefor according to the embodiments of the present invention will be described below in detail with reference to the accompanying drawings. The present invention is not limited to the embodiments.

Embodiments

Figure 1:
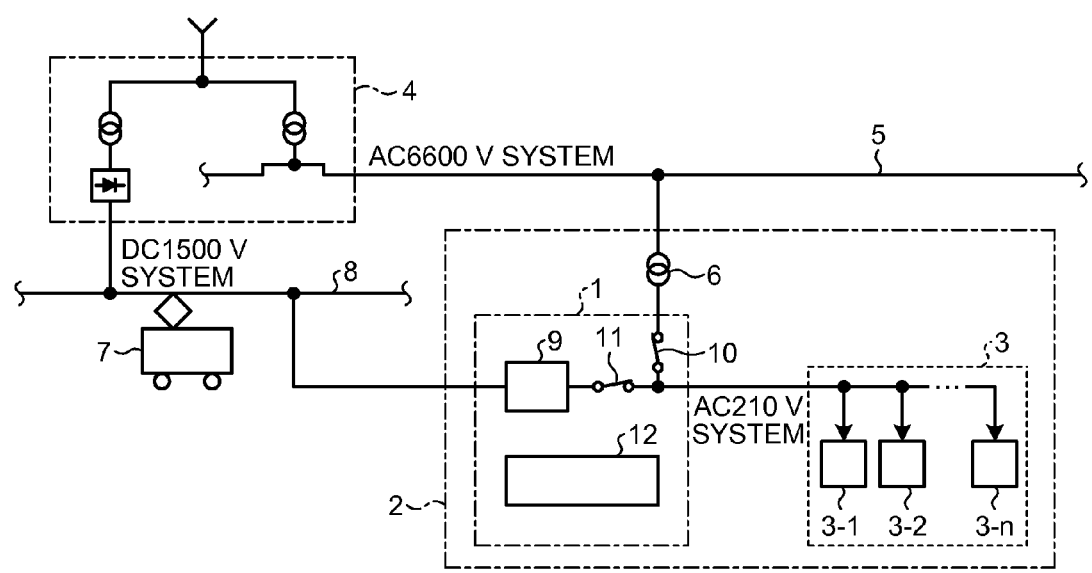
FIG. 1 is a diagram illustrating an application example of a station-building power supply device according to an embodiment.

FIG. 1 is a diagram illustrating an application example of a station-building power supply device according to an embodiment. As illustrated in FIG. 1, a station-building power supply device 1 according to the embodiment is installed in each station building 2 and is configured to supply low-voltage AC power (here, AC210 V system) to electric facilities 3-1, 3-2, . . . , 3-n, such as an air conditioner, a lighting system, and an elevator in a station yard (hereinafter, "station-building facilities 3").

High-voltage AC power (here, AC6600 V system) is supplied from a substation 4 through a high-voltage distribution line 5; is transformed to the low-voltage AC power (here, the AC210 V system) by a transformer 6 installed in a station electric room (not illustrated) and the like in the station building 2; and is supplied to the station-building power supply device 1 according to the embodiment. DC power (here, DC1500 V system) is also supplied from the substation 4 or a train 7 through an overhead wire 8 to the station-building power supply device 1 according to the embodiment.

The station-building power supply device 1 according to the embodiment includes: a power conversion unit 9 that converts the DC power supplied from the overhead wire 8 into the low-voltage AC power (here, the AC210 V system) to be supplied to the station building facilities 3; a first switch 10 that switches to or not to supply the low-voltage AC power from the high-voltage distribution line 5 via the transformer 6 to the station building facilities 3; a second switch 11 that switches to or not to supply the low-voltage AC power from the overhead wire 8 via the power conversion unit 9 to the station building facilities 3; and a control unit 12 that controls the power conversion unit 9, the first switch 10, and the second switch 11.

Figure 2:
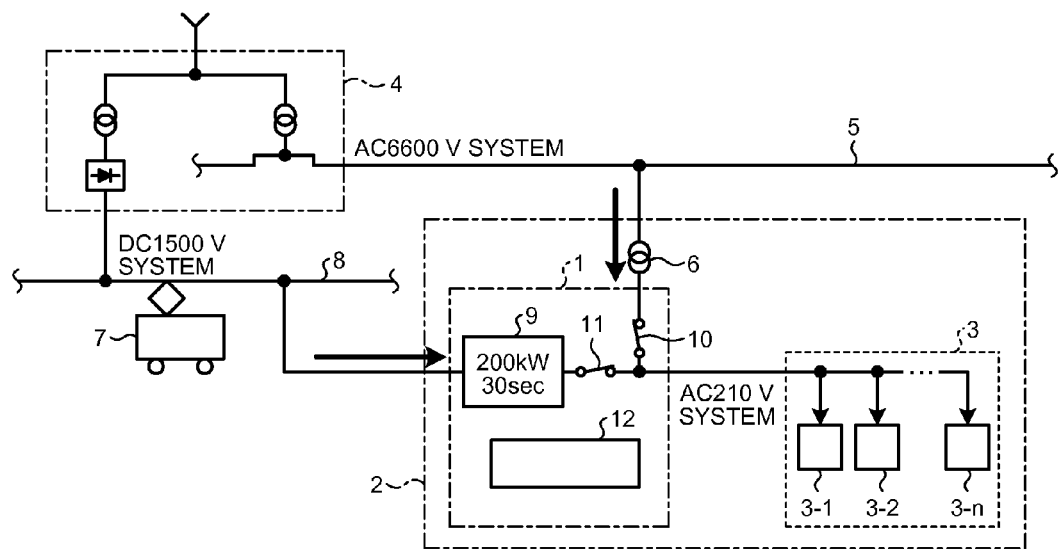
FIG. 2 are diagrams illustrating operational modes of the station-building power supply device according to the embodiment.
Figure 2:
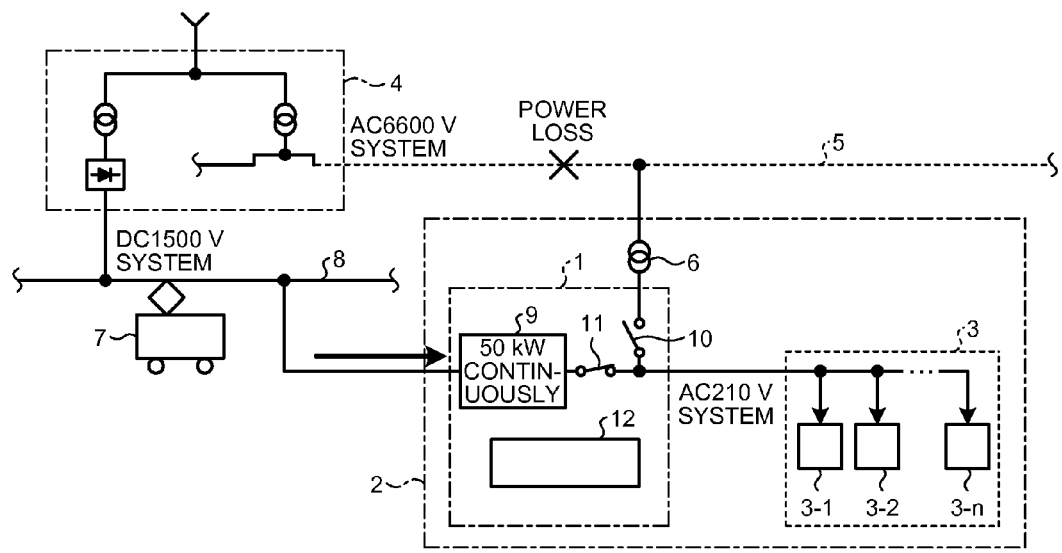

FIG. 2 are diagrams illustrating operational modes of the station-building power supply device according to the embodiment. The station-building power supply device 1 according to the embodiment has a regenerative mode illustrated in FIG. 2(*a*) and a standby power supply mode illustrated in FIG. 2(*b*) as the operational modes.

In the regenerative mode illustrated in FIG. 2(*a*), the control unit 12 sets the first switch 10 and the second switch 11 to an on-controlled state. The regenerative mode is operated when regenerative power of the train 7 running in the same power transformation zone exceeds power-running electric power during normal operation situation where no power outage or the like of the high-voltage distribution line 5 is occurring. In the case, both of surplus regenerative power supplied via the overhead wire 8 and power supplied from the high-voltage distribution line 5 are used together to supply to the station building facilities 3 with low-voltage AC power corresponding to an amount of power consumption to be normally consumed in the station building 2. Therefore, the surplus regenerative power is effectively used. Accordingly, in the regenerative mode, the control unit 12 controls the power conversion unit 9 such that it generates low-voltage AC power corresponding to a part of the amount of normal power consumption in accordance with the surplus regenerative power.

In the standby power supply mode illustrated in FIG. 2(*b*), the control unit 12 sets the first switch 10 to an off-controlled state and sets the second switch 11 to the on-controlled state. In the standby power supply mode, when the high-voltage distribution line 5 loses power, the electric power from the overhead wire 8 is used to supply to the station building facilities 3 with the low-voltage AC power corresponding to an amount of emergency power, which is minimally required in the station building 2 upon the power outage of the high-voltage distribution line 5. Accordingly, the standby power supply mode functions as an emergency power. Therefore, in the standby power supply mode, the control unit 12 controls the power conversion unit 9 such that it continuously generates the low-voltage AC power corresponding to the entirety of the amount of emergency power described above.

According to the embodiment, the power conversion unit 9 is minimally configured to be able to effectively utilize the surplus regenerative power of the train 7 generated intermittently in the regenerative mode; and to be able to generate continuously the low-voltage AC power corresponding to the total amount of the emergency power described above in the standby power supply mode. For example, it is assumed here that the power conversion unit 9 can supply 200 kilowatts for 30 seconds in the regenerative mode; and can continuously generate 50 kilowatts in the standby power supply mode. By configuring the power conversion unit 9 in this manner, the station-building power supply device 1 according to the embodiment can minimally configured such that it can have both the regenerative mode and the standby power supply mode.

Figure 3:
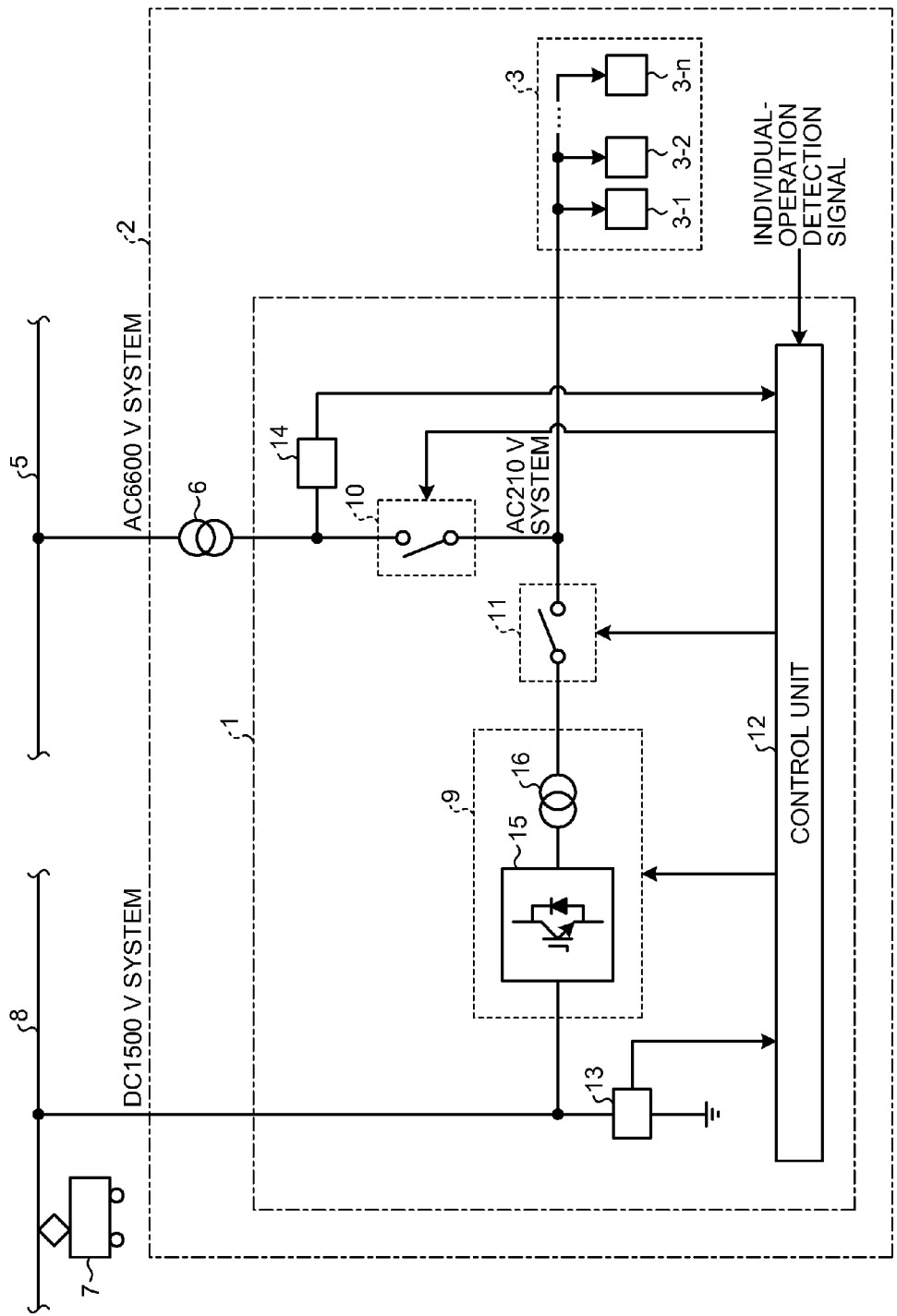
FIG. 3 is a diagram illustrating a configuration example of the station-building power supply device according to the embodiment.

FIG. 3 is a diagram illustrating a configuration example of the station-building power supply device according to the embodiment. In the example illustrated in FIG. 3, the station-building power supply device 1 includes an overhead-wire voltage detection unit 13 that detects an overhead wire voltage and a transformer output-voltage detection unit 14 that detects an output voltage of the transformer 6, in addition to the power conversion unit 9, the first switch 10, the second switch 11, and the control unit 12 described above. The power conversion unit 9 includes an inverter 15 that converts the DC power supplied from the overhead wire 8 to AC power and a transformer 16 that converts an output of the inverter 15 to low-voltage AC power (here, the AC210 V system) to be supplied to the station building facilities 3.

In the example illustrated in FIG. 3, when the overhead wire voltage detected by the overhead-wire voltage detection unit 13 exceeds a predetermined voltage threshold (for example, DC 1700 volts) during the operation in the regenerative mode, the control unit 12 determines that the surplus regenerative power is generated so as to control the drive of the inverter 15. The control unit 12 includes control software for controlling the inverter 15 in the regenerative mode and performs controlling the inverter 15. Note that the method of detecting generation of the surplus regenerative power is not limited to the method described above, and the method of detecting generation of the surplus regenerative power described above does not restrict the present invention.

Furthermore, in the example illustrated in FIG. 3, when power supply from the high-voltage distribution line 5 is shut off during the operation in the regenerative mode, an individual-operation detection signal indicating that the station-building power supply device 1 is operating individually is input to the control unit 12. Upon input of the individual-operation detection signal, the control unit 12 determines that the high-voltage distribution line 5 has lost power and stops the drive control of the inverter 15 by the control software for the regenerative mode and deactivates the power conversion unit 9. Note that the method of detecting the high-voltage distribution line 5 has lost power is not limited to the method described above, and the method of detecting the power outage of the high-voltage distribution line 5 does not restrict the present invention.

In the example illustrated in FIG. 3, when the output voltage of the transformer 6 detected by the transformer output-voltage detection unit 14 becomes a predetermined voltage value (for example, AC 210 volts) during the operation in the standby power supply mode, the control unit 12 determines that the high-voltage distribution line 5 has been recovered from a power outage, and controls the drive of the inverter 15. The control unit 12 has control software controlling the inverter 15 corresponding to the standby power supply mode, and controls the drive of the inverter 15 in the standby power supply mode with the control software for the standby power supply mode. Note that the method of detecting that the high-voltage distribution line 5 has been recovered from a power outage is not limited to the method described above, and the method of detecting the high-voltage distribution line 5 has been recovered from a power loss does not restrict the present invention.

A controlling method of the station-building power supply device according to the embodiment is described next. A control example of the station-building power supply device 1 illustrated in FIG. 3 is described with reference to FIG. 4. FIG. 4 is a control flowchart illustrating an example of a control process of the station-building power supply device illustrated in FIG. 3.

In a control flow illustrated in FIG. 4, the first switch 10 and the second switch 11 are controlled to the "on" state; and the inverter 15 is set in an operating state in the regenerative mode drive-controlled by the control software for the regenerative mode as the initial state.

While operating in the regenerative mode, the control unit 12 monitors the individual-operation detection signal so as to determine whether the high-voltage distribution line 5 has lost power (Step ST101). The control unit 12 repeatedly performs the process at Step ST101 and determines that the high-voltage distribution line 5 has not lost power (NO at Step ST101), until the individual-operation detection signal is input. Upon input of the individual-operation detection signal, the control unit 12 determines that the high-voltage distribution line 5 has lost power (YES at Step ST101) and stops the drive control of the inverter 15 by the control software for the regenerative mode, thereby deactivating the power conversion unit 9 (Step ST102). Accordingly, the operation in the regenerative mode of the station-building power supply device 1 is stopped.

Subsequently, the control unit 12 executes an off-control of the first switch 10 (Step ST103) and switches the control software of the inverter 15 from the control software for the regenerative mode to the control software for the standby power supply mode (Step ST104). The control unit 12 starts a drive control of the inverter 15 by the control software for the standby power supply mode so as to activate the power conversion unit 9 (Step ST105). Accordingly, the operation in the standby power supply mode of the station-building power supply device 1 starts. If the first switch 10 is off-controlled without deactivating the power conversion unit 9, much amount of transient current may flow in the power conversion unit 9 when the first switch 10 is off-controlled depending on a power loss state of the high-voltage distribution line 5. Therefore, before the first switch 10 is off-controlled, the power conversion unit 9 is deactivated, thereby preventing much amount of transient current from flowing in the power conversion unit 9 when the first switch 10 is off-controlled.

While operating in the standby power supply mode, the control unit 12 monitors the output voltage of the transformer 6 so as to determine whether the high-voltage distribution line 5 has been recovered from a power outage (Step ST106). The control unit 12 performs the process at Step ST106 repeatedly determining that the high-voltage distribution line 5 has not been recovered from a power outage (NO at Step ST106). When the output voltage of the transformer 6 has become a predetermined voltage value (for example, AC 210 volts), the control unit 12 determines that the high-voltage distribution line 5 has been recovered from a power outage (YES at Step ST106) and stops the drive control of the inverter 15 by the control software for the standby power supply mode, thereby deactivating the power conversion unit 9 (Step ST107). Thus, the operation in the standby power supply mode of the station-building power supply device 1 stops.

Subsequently, the control unit 12 executes an off-control of the second switch 11 (Step ST108) and then executes an on-control of the first switch 10 (Step ST109). If the on-control of the first switch 10 is executed without executing the off-control of the second switch 11, the power to be supplied from the high-voltage distribution line 5 via the transformer 6 flows back in the power conversion unit 9. Therefore, before executing the on-control of the first switch 10, the off-control of the second switch 11 is executed to prevent the power to be supplied by the high-voltage distribution line 5 via the transformer 6 from flowing back through the power conversion unit 9.

Subsequently, the control unit 12 switches the control software of the inverter 15 from the control software for the standby power supply mode to the control software for the regenerative mode (Step ST110). The control unit 12 starts a drive control of the inverter 15 with the control software for the regenerative mode to activate the power conversion unit 9 (Step ST111); executes an on-control of the second switch 11 (Step ST112); and returns the process to Step ST101. Accordingly, the operation in the regenerative mode of the station-building power supply device 1 start. If the on-control of the second switch 11 is executed before starting the drive control of the inverter 15 by the control software for the regenerative mode, power to be supplied from the high-voltage distribution line 5 via the transformer 6 flows back through the power conversion unit 9. Therefore, before the on-control of the second switch 11 is executed, the drive control of the inverter 15 by the control software for the regenerative mode starts, thereby preventing the power to be supplied from the high-voltage distribution line 5 via the transformer 6 from flowing back through the power conversion unit 9.

As described above, the station-building power supply device according to the embodiment is provided at each station building and supplies the low-voltage AC power to the station building facilities. The station-building power supply device realizes the modes: the regenerative mode in which the low-voltage AC power corresponding to the amount of normal power consumption to be normally consumed in the station building is supplied to the station building facilities by using both the surplus regenerative power supplied via the overhead wire and the power supplied from the high-voltage distribution line, when the regenerative power regenerated from the train to the overhead wire is surplus; and the standby power supply mode in which the low-voltage AC power corresponding to the amount of emergency power, which is minimally required by the station building when the high-voltage distribution line is shut off, is supplied to the station building facilities by using power supplied from the overhead wire when a of the high-voltage distribution line is shut off. Accordingly, the configuration according to the embodiment is more easily installed and operated than the configuration in which, when the emergency power is supplied to the station building, the power regenerative inverter in the substation is operated as a self-exciting inverter and supplies emergency power to a plurality of station buildings via the high-voltage or extra high-voltage distribution system. Furthermore, the configuration condition of the power conversion unit is set to the minimal configuration that can continuously generate the low-voltage AC power corresponding to the total amount of emergency power in the standby power supply mode, while effectively utilizing the surplus regenerative power of the train generated intermittently in the regenerative mode. Therefore, the configuration of the station-building power supply device can be the minimal configuration that can realize both the regenerative mode and the standby power supply mode. That is to say, this configuration is based on the amount of power required for each station building and can provide both the effective utilization of the surplus regenerative power and the supply of emergency power to the station building.

According to the controlling method for the station-building power supply device of the embodiment, when the high-voltage distribution line loses power, the power conversion unit is deactivated before the off-control of the first switch is executed. Thus, much amount of transient current can be prevented from flowing into the power conversion unit when the first switch is off-controlled.

When the high-voltage distribution line has been recovered from a power outage, the off-control of the second switch is executed before the on-control of the first switch is executed; and when starting the operation in the regenerative mode, the drive control of the inverter by the control software for the regenerative mode is started before the on-control of the second switch is executed, thereby activating the power conversion unit. Accordingly, it can be prevented that power to be supplied from the high-voltage distribution line via the transformer flows back in the power conversion unit, after the high-voltage distribution line has been recovered from a power loss.

In the embodiment described above, the example has been described in which the control unit detects a power outage of the high-voltage distribution line or recovery from a power outage of the high-voltage distribution line, so that deactivation/activation of the power conversion unit, switching of the control software of the inverter, and the on/off-control of the first and second switches are executed automatically. However, steps illustrated in FIG. 4 can be performed manually by operating a switch or the like provided on a monitoring control board or the like (not illustrated). In this case, given that the off-control of the second switch is executed after the power conversion unit is deactivated at Step ST102 and before the off-control of the first switch is executed at Step ST103; and the on-control of the second switch is executed after the power conversion unit is activated at Step ST105. Then, the safety can be ensured when the off-control of the first switch at Step ST103 is executed.

The configuration described in the above embodiment is only an example of the configuration of the present invention, and it is possible to combine the configuration with other generally-known techniques. It is needless to mention that the present invention can be configured while modifying it without departing from the scope of the invention, such as omitting a part thereof.

REFERENCE SIGNS LIST

1 station-building power supply device, 2 station building, 3, 3-1, 3-2, ... 3-n station-building facility, 4 substation, 5 high-voltage distribution line, 6 transformer, 7 train, 8 overhead wire, 9 power conversion unit, 10 first switch, 11 second switch, 12 control unit, 13 overhead-wire voltage detection unit, 14 transformer output-voltage detection unit, 15 inverter, 16 transformer.

The invention claimed is:

1. A station-building power supply device that is provided in each of one or more station buildings of electric railways and supplies low-voltage AC power to one or more station building facilities in each of the one or more station buildings, the station-building power supply device comprising:
 a regenerative mode in which, when regenerative power regenerated by a train and supplied to an overhead wire exceeds a power-running electric power, surplus regenerative power supplied via the overhead wire and power supplied from a high-voltage distribution line are used together so as to supply the low-voltage AC power corresponding to an amount of normal power consumption of a station building; and
 a standby power supply mode in which the low-voltage AC power corresponding to an amount of emergency power of the station building is supplied by using the regenerative power supplied from the overhead wire, when a power outage of the high-voltage distribution line occurs.

2. The station-building power supply device according to claim 1, further comprising:
 a first switch that switches the power supplied from the high-voltage distribution line;
 a second switch that switches the power supplied from the overhead wire; and
 a control unit that
  in the regenerative mode, closes the first switch and the second switch, and
  in the standby power supply mode, opens the first switch and closes the second switch.

3. The station-building power supply device according to claim 2, further comprising:
 a power conversion unit that converts DC power supplied from the overhead wire to the low-voltage AC power, wherein
 the control unit
  controls, in the regenerative mode, the power conversion unit so as to generate the low-voltage AC power corresponding to a part of the amount of normal power consumption corresponding to the surplus regenerative power, and
  controls, in the standby power supply mode, the power conversion unit so as to continuously generate the low-voltage AC power corresponding to an entire amount of the emergency power.

4. The station-building power supply device according to claim 3, further comprising:
 an overhead-wire voltage detection unit that detects an overhead wire voltage, wherein
 the control unit, when the overhead wire voltage exceeds a predetermined voltage threshold in the regenerative mode, determines that the surplus regenerative power is generated and controls the power conversion unit.

5. A method of controlling the station-building power supply device according to claim 3, the method comprising:
 detecting a power outage of the high-voltage distribution line, during an operation in the regenerative mode and deactivating the power conversion unit so as to stop the operation in the regenerative mode;
 opening the first switch;
 switching control software of the power conversion unit in the control unit to control software corresponding to the standby power supply mode;
 activating the power conversion unit; and
 starting an operation in the standby power supply mode.

6. A method of controlling the station-building power supply device according to claim 3, the method comprising:
 detecting recovery from a power outage of the high-voltage distribution line;
 during an operation in the standby power supply mode, deactivating the power conversion unit;
 stopping the operation in the standby power supply mode;
 opening the second switch;
 closing the first switch;
 switching control software of the power conversion unit in the control unit to control software corresponding to the regenerative mode;
 starting an operation of the power conversion unit;

closing the second switch; and starting an operation in the regenerative mode.

7. The station-building power supply device according to claim 1, wherein the regenerative power supplied from the overhead wire is the surplus regenerative power.

8. A station-building power supply device that is provided in each of one or more station buildings of electric railways and supplies low-voltage AC power to one or more station building facilities in each of the one or more station buildings, the station-building power supply device comprising:

a regenerative mode in which, when regenerative power regenerated by a train and supplied to an overhead wire exceeds a power-running electric power, surplus regenerative power supplied via the overhead wire and power supplied from a high-voltage distribution line are used together so as to supply the low-voltage AC power corresponding to an amount of normal power consumption of a station building;

a standby power supply mode in which the low-voltage AC power corresponding to an amount of emergency power of the station building is supplied by using power supplied from the overhead wire, when a power outage of the high-voltage distribution line occurs; and a control unit to switch between the regenerative mode and the standby power supply mode.

9. The station-building power supply device according to claim 8, further comprising:

a first switch that switches the power supplied from the high-voltage distribution line; and a second switch that switches the power supplied from the overhead wire, wherein the control unit in the regenerative mode, closes the first switch and the second switch, and in the standby power supply mode, opens the first switch and closes the second switch.

10. The station-building power supply device according to claim 9, further comprising:

a power conversion unit that converts DC power supplied from the overhead wire to the low-voltage AC power, wherein the control unit controls, in the regenerative mode, the power conversion unit so as to generate the low-voltage AC power corresponding to a part of the amount of normal power consumption corresponding to the surplus regenerative power, and controls, in the standby power supply mode, the power conversion unit so as to continuously generate the low-voltage AC power corresponding to an entire amount of the emergency power.

11. The station-building power supply device according to claim 10, further comprising:

an overhead-wire voltage detection unit that detects an overhead wire voltage, wherein the control unit, when the overhead wire voltage exceeds a predetermined voltage threshold in the regenerative mode, determines that the surplus regenerative power is generated and controls the power conversion unit.

12. A method of controlling the station-building power supply device according to claim 10, the method comprising:

detecting a power outage of the high-voltage distribution line, during an operation in the regenerative mode and deactivating the power conversion unit so as to stop the operation in the regenerative mode;

opening the first switch;

switching control software of the power conversion unit in the control unit to control software corresponding to the standby power supply mode;

activating the power conversion unit, and starting an operation in the standby power supply mode.

13. A method of controlling the station-building power supply device according to claim 10, the method comprising:

detecting recovery from a power outage of the high-voltage distribution line;

during an operation in the standby power supply mode, deactivating the power conversion unit;

stopping the operation in the standby power supply mode;

opening the second switch;

closing the first switch;

switching control software of the power conversion unit in the control unit to control software corresponding to the regenerative mode;

starting an operation of the power conversion unit;

closing the second switch; and starting an operation in the regenerative mode.

14. A station-building power supply device that is provided in each of one or more station buildings of electric railways and supplies low-voltage AC power to one or more station building facilities in each of the one or more station buildings, the station-building power supply device comprising:

a power conversion unit that converts DC power supplied from the overhead wire to the low-voltage AC power, wherein the power conversion unit operates both in a regenerative mode in which, when regenerative power regenerated by a train and supplied to an overhead wire exceeds a power-running electric power, surplus regenerative power supplied via the overhead wire and power supplied from a high-voltage distribution line are used together so as to supply the low-voltage AC power corresponding to an amount of normal power consumption of a station building, and in a standby power supply mode in which the low-voltage AC power corresponding to an amount of emergency power of the station building is supplied by using the power supplied from the overhead wire, when a power outage of the high-voltage distribution line occurs; and when an operational mode of the power conversion unit is switched from the regenerative mode to the standby power supply mode, the power conversion unit is controlled such that an operation in the regenerative mode is deactivated before a first switch that switches the power supplied from the high-voltage distribution line is opened, and the power conversion unit is controlled such that an operation in the standby power supply mode is started after the first switch is opened.

15. The station-building power supply device according to claim 14, further comprising:

a second switch that switches the power supplied from the overhead wire; and a control unit that in the regenerative mode, closes the first switch and the second switch, and in the standby power supply mode, opens the first switch and closes the second switch.

16. The station-building power supply device according to claim 15, wherein the control unit controls, in the regenerative mode, the power conversion unit so as to generate the low-voltage AC power corresponding to a part of the amount of normal power consumption corresponding to the surplus regenerative power, and controls, in the standby power supply mode, the power conversion unit so as to continuously generate the low-voltage AC power corresponding to an entire amount of the emergency power.

17. The station-building power supply device according to claim 16, further comprising:

an overhead-wire voltage detection unit that detects an overhead wire voltage, wherein the control unit, when the overhead wire voltage exceeds a predetermined voltage threshold in the regenerative mode, determines that the surplus regenerative power is generated and controls the power conversion unit.

18. A method of controlling the station-building power supply device according to claim 16, the method comprising:

detecting a power outage of the high-voltage distribution line, during an operation in the regenerative mode and deactivating the power conversion unit so as to stop the operation in the regenerative mode;

opening the first switch;

switching control software of the power conversion unit in the control unit to control software corresponding to the standby power supply mode;

activating the power conversion unit; and starting an operation in the standby power supply mode.

19. A method of controlling the station-building power supply device according to claim 16, the method comprising:

detecting recovery from a power outage of the high-voltage distribution line;

during an operation in the standby power supply mode, deactivating the power conversion unit;

stopping the operation in the standby power supply mode;

opening the second switch;

closing the first switch;

switching control software of the power conversion unit in the control unit to control software corresponding to the regenerative mode;

starting an operation of the power conversion unit;

closing the second switch; and starting an operation in the regenerative mode.

* * * * *